Oct. 16, 1956 B. F. VOGELAAR 2,766,572
MULTI-VALVE HYDRAULIC CONTROL SYSTEM FOR COMBINES
Filed Feb. 11, 1954 2 Sheets-Sheet 2
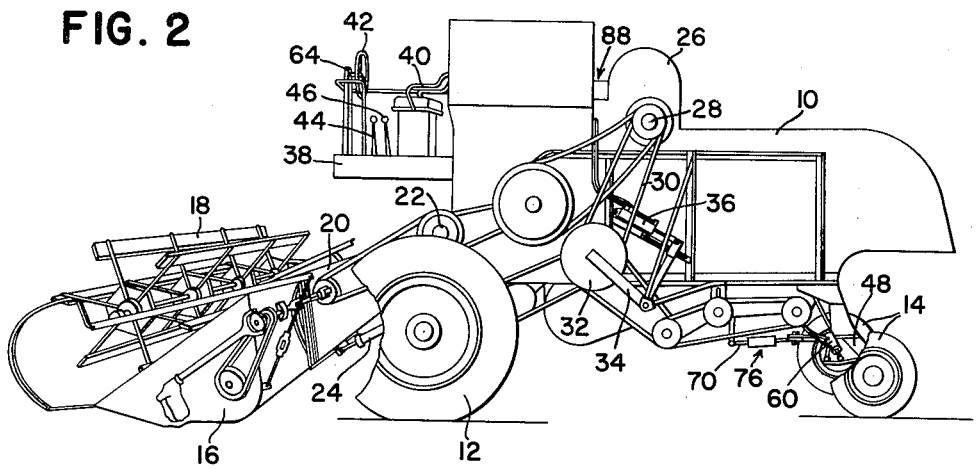
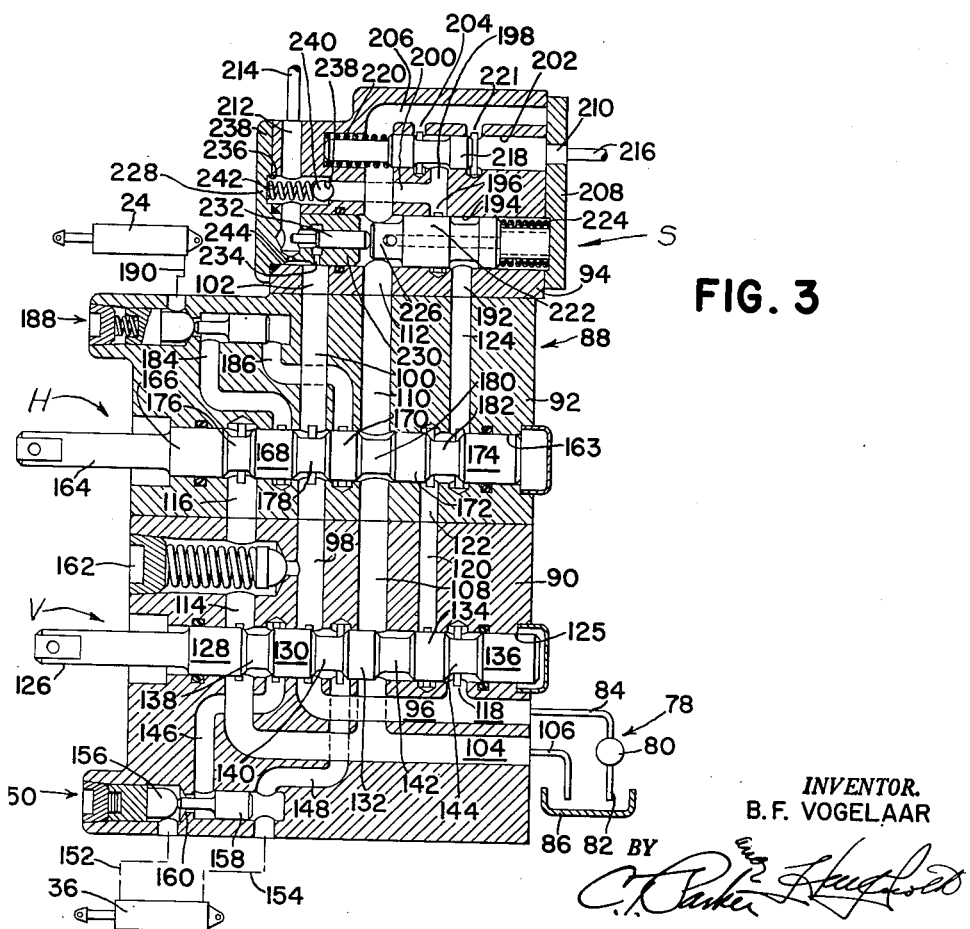
INVENTOR.
B. F. VOGELAAR
BY
ATTORNEYS United States Patent Office 2,766,572
Patented Oct. 16, 1956

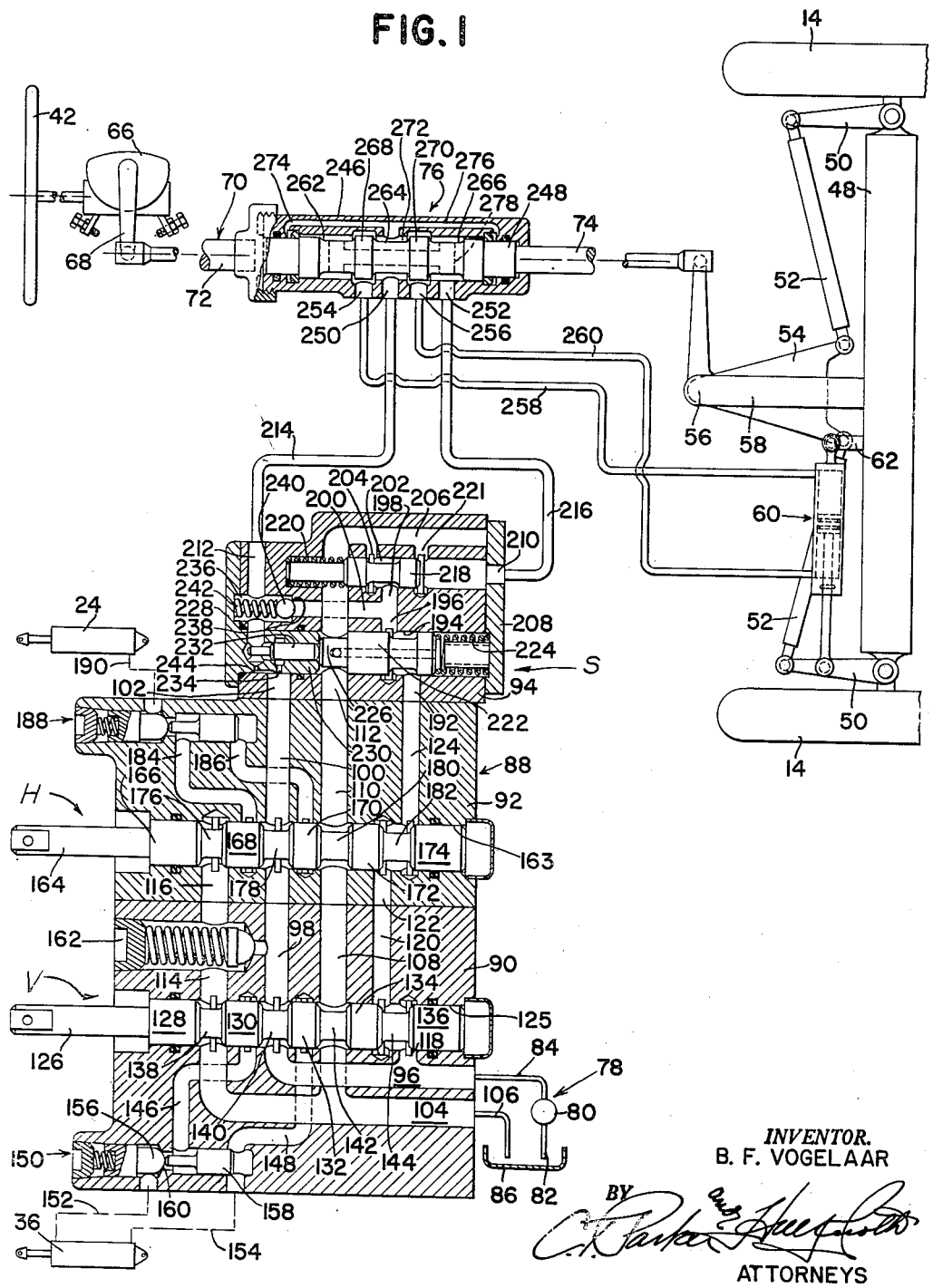

2,766,572

MULTI-VALVE HYDRAULIC CONTROL SYSTEM FOR COMBINES

Bernard F. Vogelaar, Moline, Ill., assignor to Deere & Company, Moline, Ill., a corporation of Illinois Application February 11, 1954, Serial No. 409,690

18 Claims. (Cl. 56—21)

This invention relates to a multi-valve hydraulic control system and more particularly to such system in a vehicular environment in which hydraulic steering control is accomplished in combination with the control of other devices.

Typical of a vehicle situation in which several parts, among them the steering mechanism, are required to be controlled by hydraulic cylinders or the like, is the self-propelled agricultural machine such as a combine. In a machine of this type, a relatively large main frame or thresher body is carried at its front end by large traction wheels and at its rear end on steerable rear wheels. An operator's platform is located at the front end of the thresher body and at a substantial height so that the operator has a good view of the platform or header that is carried at the front end of the body and ahead of the traction wheels. Because of the variety of conditions under which a machine such as this must operate, and because of the number of parts that must be adjusted, it has in the past been found expedient to use hydraulic power for the several purposes. Primarily, the platform or header is adjusted as to height by a hydraulic cylinder; the variable speed drive means is adjusted by a separate hydraulic cylinder; and the recent popularity of hydraulic steering in general dictates the use of a third hydraulic cylinder for steering the rear steerable wheels. In a machine of this size, the several cylinders are located respectively adjacent to the parts that they control or actuate and the valve controls for the cylinders are preferably grouped conveniently at the operator's station. This means that the several valves must be independently supplied with fluid or some compromise be reached as to the optimum location of the valves relative to the controls and the parts to be controlled.

It has been known in the past to utilize a number of valves en banc or "stacked" and fluid-connected in parallel to several motors, such as in the U. S. patent to Proctor 1,991,227 and more recently with minor refinements in Berglund 2,289,567. Neither of these patents teaches, however, the utilization with a plurality of valves of a specially constructed valve for operating steering mechanism and, although it might offhand appear that it is merely necessary to add another valve to the existing "stack," the solution is not that easy, because of the sensitivity characteristics of steering mechanism as distinguished from parts that are adjusted simply by alternately extending and retracting hydraulic motors. Consequently, those who have attempted to superimpose hydraulic steering upon hydraulic control of other parts in vehicles, and in self-propelled combines in particular, have heretofore been forced to resort to a separate pump for the hydraulic steering circuit, thus divorcing that circuit from the others and destroying whatever value is inherent in the use of a stacked or en banc system.

According to the present invention, all the advantages of a stacked or en banc system are retained and the invention features the utilization of what is known as a steering demand valve in association with the valves that control, for example, the hydraulic motor for adjusting the platform or header and the separate hydraulic motor for adjusting the variable speed drive mechanism. The use of the steering demand valve eliminates problems usually found because of the remote control characteristics of the system as a whole and also enables the use of a single source of fluid pressure. Consequently, the over-all system is made materially more economical and more easily serviceable. Moreover, the steering demand-valve can be provided as a unit that can be stacked onto an existing valve system for the header and variable speed control.

It is a feature of the invention to use pressure- or flow-responsive valves, particularly in combination with a stacked or en banc system of the character utilizing a free flow passage that is open as long as all the valves are in neutral but is closed when any one of the valves is moved to its active position. The steering demand valve incorporates a valve for closing the free flow passage when the steering circuit demands fluid at a certain rate. It is a further feature of the invention to utilize a pilot or small flow through the main steering valve and to operate the demand valve in response to flow changes in the pilot flow.

The foregoing and other important objects and desirable features inherent in and encompassed by the invention will become apparent as a preferred embodiment of the invention is disclosed in the following description and accompanying sheets of drawings, the several figures of which will be described immediately below.

Fig. 1 is a comprehensive view, largely schematic and partly in section, showing the over-all system, illustrating particularly the several circuits and the three control valves therefor, all valves being in their neutral positions.

Fig. 2 is a perspective view, with parts broken away, of a commercially popular combine of the self-propelled type, generally orienting the components of the control system.

Fig. 3 is a sectional view, like the sectional part of Fig. 1, but showing the speed-control valve in one of its active positions and showing the steering demand valve unit operative to effect the supply of fluid at working pressure to the steering portion of the circuit.

Reference will be had first to Fig. 2 for a general description of the vehicle or combine and the component parts thereof considered necessary to an understanding of the invention. The combine is of a well-known type, having a mobile frame in the form of a fore-and-aft elongated thresher body 10 carried on a pair of relatively large front traction wheels 12 (only one of which appears in the drawing) and steerable rear wheel means 14. A typical harvester platform or header is designated by the numeral 16 and has a conventional cutter bar (not shown) with which cooperates a conventional reel 18 for the harvesting of standing grain which, after being harvested, is delivered to the thresher body 10 via a fore-and-aft extending feeder house 20 pivoted to the front end of the frame or thresher body 10 on a transverse horizontal axis 22. Because of the pivot 22, the header 16 and feeder house 20 as a unit may be vertically adjusted by means of a first fluid motor 24, hereinafter called the header motor, which may be in the form of a conventional type of cylinder and piston unit.

The combine is powered by an internal combustion engine, represented generally by the numeral 26, which includes an output shaft 28 belt-connected at 30 to variable speed-drive means 32 comprising a variable speed sheave of the character forming the subject matter of U. S. Patent No. 2,510,325, the details of which are not important here, because any type of speed-change means could be used. Briefly, what is involved is the mounting of the sheave 32 on a bell crank 34 rockable by means of a fluid motor 36 (hereinafter called the variable speed motor) which, like the motor 24, may take the form of any conventional cylinder-piston unit. Whereas the motor 24 may be of the one-way type, the motor 36 is a two-way motor and selective extension and retraction thereof varies the distance between the sheave 32 and the output shaft 28. Since the sheave 32 is of the variable type, its effective diameter is altered and consequently the drive ratio between the output shaft 28 and the sheave 32 is varied.

The forward portion of the thresher body 10 carries an operator's or control station 38 on which will be found the usual seat 40, steering wheel 42, and control members or actuator elements 44 and 46 respectively for the header and variable speed motors 24 and 36.

The steerable wheels 14 are conventionally carried at opposite ends of a transverse axle 48 by means of steering knuckles 50 and these knuckles are interconnected by a pair of tie rods 52 and a central bell crank 54 pivoted at 56 on a support 58 rigid on the axle 48. Hydraulic power for steering the wheels 14 is derived from fluid motor means, hereinafter briefly called a steering motor 60, here comprising a typical cylinder-piston unit connected at one end to the left-hand steering knuckle 50 and at its opposite end to a bracket 62 anchored to the axle 48. In this portion of the description, the expressions "right-hand" and "left-hand" are used with reference to the position of an observer standing behind the machine and looking forwardly, it being also important to remember that the steerable wheels 14 are at the rear of the machine and not at the front as in the usual vehicle.

The support for the steering wheel 42, part of which support is shown at 64 in Fig. 2, includes a conventional gear housing 66 in which is contained mechanism (not shown in detail) of the worm and sector type, having an exterior output arm 68 connected by a drag link assembly 70 to the free arm of the steering bell crank 54. The drag link 70 comprises first and second drag link parts 72 and 74 interconnected by selective control means, here a steering valve 76, the details of which will be described later.

The hydraulic or fluid control system features the use of a single fluid source, herein designated generally by the numeral 78, including a pump 80 having intake and discharge lines 82 and 84 respectively and a tank or reservoir 86. The various motors 24, 36 and 60 are selectively and individually controllable by means of the levers 44 and 46 and the steering wheel 42, the arrangement being also such that any two or all three of the motors may be actuated simultaneously. This control is effective through a main valve unit, designated generally by the numeral 88, a typical location of which is indicated in Fig. 2. The linkages that interconnect the header and speed-control levers 44 and 46 are omitted from the drawings, since they may be of any suitable design and are not important to an understanding of the present invention.

The main valve unit is made up of a plurality of valve housings or casings arranged en banc or stacked and comprises a lower housing or casing 90, an intermediate housing or casing 92 and a top housing or casing 94. An arrangement embodying the two casing 90 and 92, joined together in any suitable manner in en banc relationship has heretofore been used in self-propelled machines of the combine type. The utilization of the valve casing or unit 94 is new.

The discharge line 84 of the pump 80 constitutes a pressure inlet connected to a pressure passage or line 96 in the lower housing 90. This passage has a branch passage that continues upwardly at 98 through the housing 90, and continues at 100 through the intermediate housing 92, the passage portions 98—100 affording a fluid line leading into the top housing 94 as what will be hereinafter referred to as a third motor outlet or port 102.

The valve unit 88 has a tank or reservoir line 104 leading via a tank outlet 106 to the reservoir 86. A first branch of the tank line leads upwardly through the housing 90, as at 108, and continues at 110 upwardly through the intermediate housing 92 and thence into the top housing 94 at 112. A second branch of the tank line 104 runs upwardly at 114 through the housing 90 and enters the intermediate housing 92 at 116. It is characteristic of the stacked valve design, as disclosed in the Proctor and Berglund patents mentioned above, that a free flow line or passage extends through the housing and is normally connected in series with the tank outlet when all the control valves are in neutral. Such a free flow line or passage is shown here as comprising offset portions 118 and 120 in the housing 90 and offset portions 122 and 124 in the intermediate housing 92. In a conventional design, or one omitting the steering demand valve unit or means S of the present invention, the free flow line portion 124 would be normally permanently connected to the upper end of the tank line 110 in the housing 92, and control of the free flow passage would be conventionally accomplished by any one or more of a plurality of valve means, such as a variable speed control valve means V and a header control valve means H, the details of which will be set forth below.

The lower casing or housing 90 carries the valve means V and for that purpose has therein a cylindrical valve bore 125 that intersects the vertical fluid lines 98, 108, 114 and 118—120. This valve bore carries therein for axial shifting a first or variable speed control valve member 126. The valve member 126 has thereon a plurality of lands 128, 130, 132, 134 and 136 and a plurality of grooves 138, 140, 142 and 144. These are so arranged that when the valve member 126 is in its neutral position (Fig. 1) the groove 144 permits free communication between the free flow passage or line portions 118 and 120; the groove 142 does not obstruct the tank line 108; the groove 140 keeps the vertical pressure line 98 open and the groove 138 keeps the tank branch 114 open. The lands 130 and 132 respectively block motor passages 146 and 148 that lead to the variable speed motor 36 via a pressure-actuated check valve 150 and motor conduits 152 and 154. The check valve 150 comprises a spring-loaded member 156 and a plunger 158. In the absence of pressure in either of the motor passages 146 or 148, the member 156 seats at 160 and cuts off communication between the passage 146 and the conduit 152. In the event of a pressure rise in the passage 146, the plunger 158 is caused to move to the right and the member 156 to the left (as seen on the drawing) to enable the delivery of fluid to the left-hand end of the variable speed motor 56, fluid returning from the conduit 154 flowing around the plunger 158 to the motor conduit 148. Conversely, when pressure is supplied to the passage 148, the pressure moves the plunger 158 to the left and unseats the member 156, so that fluid under pressure is delivered to the motor 36 via the line 154 while returning fluid can pass through the port 160 to the motor passage 146. These results are brought about by shifting of the valve member 126 from its neutral position shown in Fig. 1 to either one of two active positions, one of which is shown in Fig. 3, the valve member 126 having been shifted to the right so that the following blockades and openings occur: The land 134 separates the free flow portions 118 and 120. The groove 142 opens the tank line 108, which is specifically immaterial in the circumstances just considered. The groove 140 establishes communication between the pressure line portion 98 and the motor passage 148. And the groove 138 connects the other motor passage 146 with the tank line 104 via the tank line branch 114. As fluid pressure rises in the motor passage 148, it forces the check valve plunger 158 to the left, allowing fluid under pressure to be delivered to the right-hand end of the motor 36. At the same time, the plunger 158 opens the check valve member 156 so that fluid returning from the left-hand end of the motor 36 via the line 152 is free to enter the motor passage 146 and flow thence via the tank line branch 114 to the tank line 104 and through the outlet 106 to the reservoir 86. Since the valve land 134 establishes a blockade between the free flow line portions 118 and 120, the free flow line is no longer free to carry fluid to the tank line portions 110, 108 and 104 (assuming, in the absence of the steering demand valve unit 94, that the upper end of the free flow line 124 is connected in series to the upper end of the tank outlet branch 110).

When the valve member 126 is shifted to its opposite active position, the free flow portions 118 and 120 are blocked by the valve land 136 and the connections of the motor passages 146 and 148 with respect to the pressure line 96 and tank line 104 are reversed, which is merely characteristic of the two-way operation of the variable speed motor 36.

The intermediate valve section or housing 92 may be substantially identical to the housing 90, except that the housing 90 includes a pressure-relief valve 162 which need not be duplicated in the housing 92, nor need it be repeated in any similar housings that are stacked one on top of the other to create the en banc assembly. For present purposes, these details will be considered unimportant, particularly in view of the Proctor and Berglund patents.

The leader control valve means H is carried in the intermediate housing 92, which has a valve bore 163 that intersects the lines 100, 110, 116 and 122—124, and a header control valve 164 is axially positionable in the bore for regulating the header motor 24. The header valve member 164 is identical to the variable speed valve member 126 and has a plurality of lands 166, 168, 170, 172 and 174 and a plurality of grooves 176, 178, 180 and 182.

The only difference between the operation of the valve 164 over that of the valve 126 is that the valve member 164 is associated with the one-way header motor 24 whereas the valve member 126 controls the two-way variable speed motor 36. Hence, although the intermediate housing or casing 92 includes a pair of motor ports 184 and 186, only the passage 184 is utilized as a motor passage, communicating via a check valve assembly 188 and a motor conduit 190 with the motor 24, and the passage 186 is used to unload the check valve. Since the check valve assembly 188 is identical to that previously described at 150, the details thereof need not be repeated. The controlling relationship between the various lands, grooves and passages will be apparent by a comparison of the valve member 164 with the valve member 126. It may be significant, however, to note that when the valve member 164 is shifted to the left, the land 174 cuts off the free flow line portions 122 and 124 from each other. The same result is obtained by the land 172 when the valve member 164 is shifted to the right.

Again assuming for the moment that the upper end of the free flow line portion 124 is connected directly in series with the upper end of the tank line portion 110, it will be seen that as long as both the valve members 126 and 164 are in neutral, the free flow line 118—120—122—124 is openly connected in series to the tank line 110—108—104 and that fluid from the pump 80 will recirculate to the reservoir 86 at no appreciable pressure. At the same time, it will be noted, movement of either of the valve members 126 or 164 to an active position causes blocking of the free flow line and thus interrupting of the free circulation, resulting in the delivery of fluid under pressure through whichever motor passage is opened at the time. This is, as has been stated above, characteristic of the en banc system of the patents previously identified, and enables the use and control of a plurality of motors connected in parallel to a single pressure source. In the present case, the motors 36 and 24 are connected in parallel to the pressure line 96—98—100. The motor passages 146 and 148 are selectively controllable by the land 130 and grooves 138 and 140 for connection to the pressure line, leaving a portion of the fluid under pressure available for connection to the header motor passage 184 (although the passage 186 could be selectively utilized if the header motor 24 were replaced by a two-way motor).

One of the significant features of the present invention is to utilize the steering demand valve S, embraced in the casing 94, as a controllable means connecting the free flow line portion 124 and the tank line portion 110 and at the same time utilizing the characteristic of interrupting fluid flow in the free flow line when any one or more of the motors 24, 36 or 60 requires fluid.

As previously described, the steering demand valve housing 94 has the passages 102 and 112 respectively in permanent communication with the pressure and tank line portions 100 and 110 in the housing 92. The steering demand valve housing 94 has a third passage 192 in permanent communication with the free flow line portion 124 of the housing 92. The passage 192 is offset axially across a valve bore 194 from a continuation passage 196 which has a tank branch 198 and a pilot branch 200. The tank branch 198 leads into a second and smaller valve bore 202 and finds its outlet in a controllable tank orifice 204, which orifice leads into a horizontal continuation 206 of the tank line portion 112 previously described, the passage 112 intersecting the valve bore 194. The right-hand end of the housing 94 (as seen in Figs. 1 and 3) includes a closure plate 208 which closes the right-hand ends of both of the valve bores 194 and 202 and which has therein an inlet 210 through which fluid may flow to the right-hand end of the upper valve bore 202.

The passage 102, previously referred to as a third motor outlet or passage, communicates via means to be presently described with an upright discharge line 212 formed as a passage in the casing 94 and extended by a conduit 214 for remote connection to the steering valve 76 to serve as a steering valve high-pressure line. The inlet or return 210 is connected to and forms a continuation of a steering valve return line or conduit 216.

The upper valve bore 202 in the steering demand valve housing or casing 94 carries a flow- or pressure-responsive valve means 218, which is spring-loaded or biased, as at 220, for movement to the right to control the tank orifice 204 as well as a return orifice 221 situated between the bore 202 and the continuation 206 of the tank line 112.

The valve bore 194 is controlled by a larger valve means 222 which is biased or loaded by a spring 224 for movement to the left, in which position it normally communicates the free flow line portions 192 and 196, having a reduced end portion 226 which in no position interferes with communication between the tank line portions 206 and 112. An end member 228 on the casing or housing 94 includes a plug-like portion 230 against which abuts the reduced portion 226 of the valve 222 when the valve is in the position shown in Fig. 1. The plug-like portion is bored to carry a small plunger-type valve means 232, which is neutrally positionable as shown in Fig. 1 to close a supply port 234 between the third motor outlet or supply line 102 and the discharge line 212—214.

The flow- or pressure-responsive valve 232 is upstream of the communication between the pilot branch or line 200 and the discharge line 212—214, which communication is effected by a check valve chamber 236 having a seat 238 normally closed by a ball check valve means 240 backed up by a spring 242. The check valve 240 combines with the tank orifice 204 and pilot branch 200 to afford means operative to split off a portion of fluid from the free flow line as a pilot flow, as will hereinafter appear.

Upstream of the pressure-responsive valve 232 is a restricted by-pass line 244 fluid-connecting the motor outlet or supply port 102 and the discharge line 212 in by-passing relationship to the port 234 and valve 232.

The steering control valve, previously designated generally by the numeral 76, comprises a valve housing 246, rigidly connected to the drag link part 72, and an axially shiftable valve 248, rigidly connected to the other drag link part 74. The valve housing 246 has an inlet 250 for the discharge line 212—214 and a return outlet 252 for connection to the return line 216—210, in addition to which the valve housing 246 has motor ports or passages 254 and 256 permanently fluid-connected by conduits 258 and 260, respectively, to opposite ends of the steering motor 60, these conduits serving alternately as inlet and exhaust lines, depending upon the direction of operation of the motor, as is conventional. The valve member 248 has three grooves 262, 264 and 266 separated by a pair of lands 268 and 270, and it is by means of these lands and grooves and an internal passage 278 that the steering valve is selectively operative between neutral and active positions to control the supply of fluid to and from the steering motor 60 via the demand valve unit 94. The inlet 250 communicates with a central pressure chamber 272 and branches 274 and 276 lead to opposite ends of the valve housing for balancing the valve 248, which details are substantially without significance here, being shown only because the drag link or steering valve 76 is of conventional construction heretofore known.

When the steering valve member 248 is neutrally positioned relative to the steering valve housing 246, the lands 268 and 270 occupy the positions shown in Fig. 1. In these positions, the lands do not completely disestablish communication between the inlet 250 and return 252, and thus provide for a series connection of the discharge line 212—214 and the return line 216. Therefore, a pilot fluid flow of predetermined flow characteristics may occur as long as fluid is being supplied at the necessary pressure and rate. As will be apparent from the following description of the operation of the system, the pilot flow may occur regardless of whether the free flow line is open or closed.

*Operation*

When all valves 126, 164 and 76 occupy their neutral positions, as in Fig. 1, the free flow line 118—120—122—124—192—196, which constitutes a first fluid line, is open to the outlet 106 via the tank branch 198, tank orifice 204, tank line 206 and outlet passage or line 112—110—108—104. However, because of the restricted nature of the tank orifice 204, all of the fluid cannot flow to the tank line 206 and consequently some of it is diverted or split off at 196 through the pilot branch 200 in quantity and at a pressure sufficient to open the pilot line check valve 240 so that the pilot flow enters the discharge line 212. Since, when the steering valve 76 is in neutral, the lands 268 and 270 in that valve do not completely disconnect communication between the line 214 and the line 216, the pilot flow is free to flow from the inlet 250 to the return outlet 252 in the steering valve housing 246, returning via the line 216 and return inlet 210 in the housing 94 to the upper small valve bore 202. The rate of flow is sufficient to move the valve 218 to the left against its relatively light spring 220, fluid in excess of that necessary to maintain the open position of the valve 218 entering the tank line 206 via the orifice 221. Consequently, as long as the pilot flow continues in the circuit just described, the valve 218 will be maintained in its open position. The fluid flow characteristic of the pilot flow at that time is such that pressure is not built up in the discharge line 212 sufficient to change the position of the normally closed plunger valve 232. Consequently, the spring 224 behind the valve 222 is sufficient to urge that valve to the left. Since the reduced end 226 of the valve 222 engages the right-hand end of the plunger valve 232, the valve 232 is maintained in its closed position, separating the third motor outlet 102 from the discharge line 212 except for flow through the orifice 244, because the valve 232 closes the supply port 234.

Of course, the variable speed valve member 126 and header valve member 164 are also in their neutral positions so that the free flow line or passage is complete from the pressure line 96. The increase in pressure at which the fluid circulates because of the splitting off at the pilot branch 200 is naturally below that required to open the pressure-relief valve and the pilot flow occurs without any undesirable effect on the other valves.

Let is now be assumed that the operator desires to steer the combine while leaving the other control valves 126 and 164 in neutral. Consequently, the free flow line is still established as a first fluid line, as is the pilot flow. When the steering wheel is turned to actuate the actuator element comprising the drag link 70 and actuator arm 68, the resistance afforded by the tendency of the wheels 14 to maintain their present status causes relative movement between the steering valve parts or members 246 and 248. For example, if it is desired to steer the wheels 14 to effect a right turn, the steering valve housing 246 will move to the right relative to the steering valve part or member 248, whereupon the land 270 disconnects the return outlet 252 from the central pressure chamber 272, which has heretofore been supplied by the inlet 250 and discharge line 212—214. When the land 270 thus cuts off the return outlet 252, pilot flow in the return line 216—210 ceases and the spring 220 moves the valve 218 to the right and further restricts or even closes the tank orifice 204. Since the free flow line is no longer connected to the tank, the pilot flow through the pilot branch 200 and past the check valve 240 will increase. Pressure will build up in the discharge line 212—214 sufficient to overcome the spring 224 which, as previously described, acts against the valves 222 and 232. The fluid pressure thus opens the valve 232, by moving it to the right so as to uncover the supply port 234. Simultaneously, the larger valve 222 moves to the right and breaks the communication between the free flow line portions 192 and 196, thus disconnecting the free flow line completely from the tank line. Consequently, pressure will rise in the pressure line 96—98—100—102 and the increased pressure will enter via the supply port 234 to the discharge line 212—214 and through the now shifted steering valve 76 to the top end of the motor 60 via the line 258, which line then serves as an inlet line to the motor. Fluid returning from the opposite end of the steering motor 60 via the line 260, currently functioning as an exhaust line, enters the motor port 256 in the steering valve housing 246 and flows past the land 270 to the return outlet 252 and thence via the return line 216—210 to the upper valve bore 202, this flow again opening the valve 218 (moving it to the left against its spring 221) so that the return can pass through the orifice 220 to the tank line 110. Although opening of the valve 218 was necessary to establish the pilot flow so as to effect the splitting off of fluid at 198 and 200, opening of the valve 218 at this time has absolutely no effect on the pilot flow, since the lower valve 222 has closed off the free flow line. Consequently, exhaust from the motor 60 via the line 216—210 follows the tank line portions 206—112—110—108 and 104 to the reservoir 86 via the tank outlet 106.

When the steering valve returns automatically to neutral, which it will do when the steerable wheels have steered in proportion to shifting of the valve parts 246 and 248, the lands 268 and 270 becomes again centered respectively on the ports 254 and 256, re-establishing pilot flow conditions in the lines 212—214 and 216—210, whereupon pressure drops in the line 212—214 and the spring 224 simultaneously opens the valve 222 and closes the valve 232. The free flow passage is thus again opened and the system is in neutral as before.

As described above, it is a characteristic of the valves en banc that movement of any one of them to an active position blocks the free flow line so as to cause a pressure increase available for supplying the motor of the valve that is moved to its active position. This is exactly the result that occurs by movement of the valve 222 to the right (as seen in Fig. 3) whereby the free flow line is blocked not only in the same manner that it would be blocked by movement of either of the valve members 126 or 164 but by hydraulically responsive means that are remotely controlled, it being noted that the unit 88 is at a central point on the combine, whereas the steering motor 60 is relatively remote from the unit and the unit is also relatively remote from the steering wheel 42. The utilization of the design just described eliminates complicated mechanical linkages and at the same time permits the retension of the features of the en banc valve system.

Fig. 3 illustrates a condition in which the variable speed valve member 126 has been moved to the right, resulting in blockading of the free flow line at 118 and 120. This means, of course, that fluid in the free flow line is no longer available for transmission through the pilot branch 200. But this does not mean that the steering demand valve is not operative, for the by-pass line 244 enables the pilot flow to achieve the purposes previously described, at least to the extent that the pilot flow, when flowing at a certain rate or pressure, has no effect on the closed plunger valve 232, whereas a variation in the flow characteristic of the pilot flow will move the valve 232 to the right.

Let it be assumed that the steering control valve is in neutral, in which the various valves of the demand valve unit will occupy their respective positions of Fig. 1. Let it be further assumed that the variable speed valve member 126 is moved to the right as shown in Fig. 3. As stated above, this discontinues the free flow line source of fluid for the pilot branch, since the land 134 on the valve member 126 disconnects the free flow line portions 118 and 120. Pressure rises in the pressure line 96—98, part of it flowing through the now open motor passage 148 via the valve groove 140. Since the pressure line portion 100 and consequently the header motor passages 184 and 186, as well as the third motor outlet 102, are in parallel, fluid is still available for the operation of either of the header or steering motors. That is to say, not all of the available fluid flow is needed for operation of the variable speed motor 36 when the variable speed motor valve member 126 is activated. Remaining fluid available in the pressure line 100—102 (assuming that the valve member 164 remains in neutral) will enter the discharge line or passage 212 via the restricted by-pass line 244, it being remembered that the plunger valve 232 is at the present time in the closed position of Fig. 1 and consequently blocks the supply port 234.

Thus, the pilot flow is via the restricted by-pass line 244 and then through the lines 212, 214, 216 and 210 as before, opening the valve 218 and passing to the tank outlet at 221. In this instance, the valve 218, although opened by return pilot flow having as its source the by-pass line 244, will not have the previously described effect on splitting off of fluid at 200, since the free flow line has already been closed by the land 134 of the variable speed valve member 126 when shifted to the Fig. 3 position. However, when the steering control valve 76 is actuated as before—that is, in such manner as to move the valve member 248 in one direction or the other so that the lands 268 or 270 cut off the central pressure chamber 272 from the return line—free flow of the pilot flow is opposed by the necessity for the pressure to first build up sufficiently to actuate the steering motor 60. As the pressure builds up, it creates a pressure rise in the chamber formed by the lower portion of the discharge passage around the left-hand end of the plunger valve 232 and when the pressure builds up sufficiently, the plunger valve is shifted to the right and the supply port 234 is opened, enabling an increase in volume to occur in the discharge line 212—214 for supplying the steering motor 60.

When the steering valve returns to neutral, pressure will drop in the line 212—214 and the spring 224, acting through the valve 222, will close the valve 232. In a situation as described above, in which the free flow line is at the moment controlled by only the valve 222, the free flow through that line would be restored. However, in the present instance, the free flow line is already blocked by the valve member 126 (land 134, Fig. 3) and movement of the valve 222 has no effect, except to be restored to its free-flow-line-opening position so that when the valve member 126 is restored to neutral, the free flow line will function to deliver part of the fluid flow to the tank line 206—112 and part to the pilot branch 200.

The above described result would still occur were the valve member 164 moved to either of its active positions, either alone or in unison with the variable speed control valve 126, the single pressure source 78 having sufficient capacity to accommodate all three motors in parallel.

The specifically enumerated objects and features of the invention will be seen to be readily achieved by the preferred embodiment of the invention disclosed. Other objects and features not so specifically enumerated will undoubtedly occur to those versed in the art, as will various modifications and alterations in the preferred form of the invention, all of which may be accomplished without departing from the spirit and scope of the invention.

What is claimed is:

1. A fluid flow control system, comprising: means providing a fluid pressure inlet; means providing a tank outlet; a first fluid line leading from the inlet to the outlet; means in the fluid line between the inlet and outlet, and including a pilot branch having check valve means therein, operative to split off from said line a portion of said line fluid as a pilot flow through said pilot branch and past said check valve means; a discharge line leading from the pilot branch downstream from the check valve means; a return line leading to the first fluid line downstream from the pilot branch; fluid motor means having inlet and exhaust lines; selective control means interconnecting the discharge and return lines and connected to the motor for normally conducting the pilot flow from the discharge line to the return line exclusive of the motor means and adjustable to decrease the pilot flow to the return line and thereafter to connect the discharge line to the motor inlet line and the motor exhaust line to the return line; first valve means normally held open by pilot flow in the return line and operative in response to the aforesaid decrease in pilot flow to restrict the first fluid line downstream of the pilot branch and thereby to incur an increase in pilot flow through the pilot branch to the discharge line, said first valve means subsequently being re-opened by motor exhaust fluid in the return line; a second fluid line connected to the fluid pressure inlet in parallel with the first fluid line and having a supply port connected to the discharge line in parallel with the pilot branch and downstream from the check valve means; second valve means normally closing the supply port and operative in response to increased pilot flow in the discharge line to open said supply port; and third, normally open valve means operative to close the first fluid line upstream of the return line so as to prevent circulation of fluid to the outlet from the scond fluid line via the first fluid line upon re-opening of the first valve means by motor exhaust fluid and thereby to incur increased fluid flow in the second fluid line through the open supply port.

2. The invention defined in claim 1, including: normally open means, in addition to the third valve means, for closing the first fluid line between the pressure inlet and the third valve means and thereby nullifying the third valve means and the pilot branch and incurring increase in fluid flow in the second fluid line; and a restricted by-pass line connecting the second fluid line to the discharge line in by-passing relation to the closed supply port for leading off from said second fluid line a portion of fluid as a substitute pilot flow.

3. The invention defined in claim 1, including: means mechanically associating the second and third valve means so as to incur closing of said third valve means substantially simultaneously with opening of said second valve means; and biasing means acting on one of said second and third valve means and effective through said mechanical means to incur re-closing of said second valve means and re-opening of said third valve means substantially simultaneously.

4. A fluid flow control system, comprising: means providing a fluid pressure inlet; means providing a tank outlet; a first fluid line leading from the inlet to the outlet; means in the fluid line between the inlet and outlet, and including a pilot branch having check valve means therein, operative to split off from said line a portion of said line fluid as a pilot flow through said pilot branch and past said check valve means; a discharge line leading from the pilot branch downstream from the check valve means; a return line leading to the first fluid line downstream from the pilot branch; fluid-conducting means interconnecting the discharge and return lines for normally conducting the pilot flow from the discharge line to the return line and adjustable to affect said pilot flow so as to incur a decrease therein in the return line; first valve means normally held open by normal pilot flow in the return line and operative in response to said decrease in pilot flow to restrict the first fluid line downstream of the pilot branch and thereby incurring an increase in pilot flow through the pilot branch to the discharge line; a second fluid line connected to the inlet in parallel with the first fluid line and having a supply port connected to the discharge line in parallel with the pilot branch and downstream of the check valve means; and second valve means normally closing the supply port and operative to open said port in response to increased pilot flow in the discharge line.

5. The invention defined in claim 4, including: normally open means for closing the first fluid line upstream of the pilot branch and thereby nullifying said pilot branch and incurring increased fluid flow in the second fluid line; and a restricted by-pass line connecting the second fluid line to the discharge line in by-passing relation to the closed supply port for splitting off a portion of said second line fluid as a substitute pilot flow.

6. A fluid flow control system, comprising: means providing a fluid pressure inlet; means providing a tank outlet; a first fluid line leading from the inlet to the outlet; means in the fluid line between the inlet and outlet, and including a pilot branch having check valve means therein, operative to split off from said line a portion of said line fluid as a pilot flow through said pilot branch and past said check valve means; a discharge line leading from the pilot branch downstream from the check valve means; a return line leading to the first fluid line downstream from the pilot branch; fluid-conducting means interconnecting the discharge and return lines for normally conducting the pilot flow from the discharge line to the return line and adjustable to affect said pilot flow so as to incur a pressure increase therein in the discharge line; a second fluid line connected to the inlet in parallel with the first fluid line and having a supply port connected to the discharge line in parallel with the pilot branch and downstream of the check valve means; and valve means normally closing the supply port and opening the first fluid line and operative in response to said pilot flow pressure increase to close the first fluid line and thereby incurring increased fluid flow in the second line and to substantially simultaneously open the supply port to said increased second line flow.

7. A fluid flow control device including casing means comprising: a tank outlet; a first fluid line leading to and for normally conducting fluid to the outlet; means in the first fluid line upstream of said outlet, and including a pilot branch having check valve means therein, for splitting of a portion of said line fluid as a pilot flow through said pilot branch; a discharge line leading from the pilot branch downstream of the check valve means; a return line leading to the first fluid line downstream of the pilot branch and adapted to be connected to the discharge line for returning pilot flow to the tank outlet via the first fluid line downstream of the pilot branch; a second fluid line in parallel with the first fluid line and having a supply port connected to the discharge line in parallel with the pilot branch downstream of the check valve means; first valve means normally held open by a predetermined rate of pilot flow in the return line and operative in response to a drop in said pilot flow rate to restrict the first fluid line downstream of the pilot branch and thereby to incur an increase in pilot flow through the pilot branch to the discharge line; second valve means normally closing the supply port and operative to open said port in response to increased pilot flow in the discharge line; and third, normally open valve means operative to close the first fluid line upstream of the return line so as to prevent circulation of fluid to the outlet via said first fluid line in the event of re-opening of the first valve means and thereby to incur increased fluid flow in the second fluid line and through the open supply port.

8. The invention defined in claim 7, including: means mechanically associating the second and third valve means so as to incur closing of said third valve means substantially simultaneously with opening of said second valve means; and biasing means acting on one of said second and third valve means and effective through said mechanical means to incur re-closing of said second valve means and re-opening of said third valve means substantially simultaneously.

9. A fluid flow control device including casing means comprising: a tank outlet; a first fluid line leading to and for normally conducting fluid to the outlet; means in the first fluid line upstream of said outlet, and including a pilot branch having check valve means therein, for splitting of a portion of said line fluid as a pilot flow through said pilot branch; a discharge line leading from the pilot branch downstream of the check valve means; a return line leading to the first fluid line downstream of the pilot branch and adapted to be connected to the discharge line for returning pilot flow to the tank outlet via the first fluid line downstream of the pilot branch; a second fluid line in parallel with the first fluid line and having a supply port connected to the discharge line in parallel with the pilot branch donwstream of the check valve means; first valve means normally held open by a predetermined rate of pilot flow in the return line and operative in response to a drop in said pilot flow rate to restrict the first fluid line downstream of the pilot branch and thereby to incur an increase in pilot flow through the pilot branch to the discharge line and an increase in fluid flow in the second suplpy line; and second valve means normally closing the supply port and operative to open said port to said increased second line flow in response to increased pilot flow in the discharge line.

10. A fluid flow control device including casing means comprising: a tank outlet; a first fluid line leading to and for normally conducting fluid to the outlet; means in the first fluid line upstream of said outlet, and including a pilot branch having check valve means therein, for splitting of a portion of said line fluid as a pilot flow through said pilot branch; a discharge line leading from the pilot branch downstream of the check valve means for normally carrying the pilot flow at a substantially uniform pressure; a second fluid line in parallel with the first fluid line and having a supply port connected to the discharge line in parallel with the pilot branch downstream of the check valve means; and valve means normally closing the supply port and opening the first fluid line and operative in response to pressure rise of pilot flow in the discharge line to close the first fluid line and to open the supply port.

11. A fluid flow control system, comprising: a single fluid pressure source having a pressure line and a tank line; first and second fluid motors; first and second fluid lines connected in parallel to the pressure line and each adapted to carry fluid at a predetermined pressure; a first motor valve controlling the first fluid line and selectively neutrally and actively positionable to cut said first fluid line respectively out of and in to the pressure line; a fluid-flow-responsive valve in the second fluid line and normally closing said second line irrespective of fluid-flow changes upstream thereof but adapted to open said second line in response to changes in a selected uniform fluid-flow characteristic downstream thereof; a third fluid line connected to the fluid source and leading to the second line downstream of the fluid-flow-responsive valve for introducing to said second line a pilot flow of fluid substantially at the aforesaid uniform fluid-flow characteristic; and steering valve means in the second fluid line between the fluid-flow-responsive valve and the second motor neutrally positionable to cut out the second motor and to carry the pilot flow at said uniform fluid-flow characteristic and actively positionable to cut in said second motor and to incur in said pilot flow a fluid-flow change sufficient to incur opening of the fluid-flow responsive valve.

12. The invention defined in claim 11, in which: the first motor valve has a portion controlling the third fluid line and arranged to open said third line and to close said third line respectively in the neutral and the active positions of said first motor valve; and a restricted by-pass line connects the pressure line and the second fluid line in by-passing relation to the pressure-responsive valve for supplying a substitute pilot flow to the second fluid line downstream of the fluid-flow responsive valve when said third fluid line is closed.

13. In a self-propelled combine having an adjustable header, variable-speed drive means and steerable wheel means, the improvement residing in a triple-valve hydraulic control system, comprising: a single fluid pressure source and a tank line; a header motor, a variable-speed motor and a steering motor individually connected respectively to the header, the variable-speed drive means and the wheel means; first, second and third individual fluid-conducting means connected in parallel to the pressure source and leading respectively to the header motor, the variable-speed motor and the steering motor; a header valve controlling the first fluid-conducting means and neutrally positionable to cut off only the header motor from the pressure source and actively positionable to direct part of the pressure source fluid to said header motor; a variable-speed valve operative independently of the header valve for controlling the second fluid-conducting means and neutrally positionable to cut off only the variable-speed motor from the pressure source and actively positionable to direct part of the pressure source fluid to the speed-change motor; a free flow line leading from the pressure source to the tank line and controlled by the header and variable-speed valves so as to be open to said tank line when both of said valves are neutrally positioned and cut off from said tank line when either of said valves is actively positioned; said third fluid-conducting means including a pilot inlet branch upstream of the steering motor, a port upstream of said pilot branch and a pressure-responsive valve normally closing said port; means operative on the open free flow line for splitting off a portion of the free flow line fluid as a pilot flow and leading said pilot flow through the pilot branch; a steering valve in the third fluid-conducting means intermediate the pressure-responsive valve and the steering motor and neutrally positionable to cut out the steering motor and to carry the pilot flow to the tank outlet line at a predetermined pressure and actively positionable to cut in the steering motor and to incur a pressure change in the pilot flow resulting in opening of the port by the pressure-responsive valve; and means operative on the free flow line in response to active postioning of the steering valve to cut off the free flow line from the tank line.

14. In a harvester having an adjustable part and steering mechanism including steerable wheel means and a steering actuator, the improvement residing in a multi-valve hydraulic control system, comprising: first and second separate hydraulic motors respectively for the adjustable part and the steerable wheel means; a fluid pressure source; a tank line; a pressure line connected to the pressure source and having first and second motor outlets in parallel; a free flow line connected to the pressure source in parallel with the pressure line and leading to the tank line; a first motor conduit connecting the first motor outlet to the first motor; a first motor valve operative in a neutral position to open the free flow line, to cut off the first motor outlet from the pressure line and to leave the second motor outlet connected to the pressure line and further operative in an active position to block the free flow line and to leave both motor outlets connected to the pressure line; a discharge line leading from the second motor outlet; a return line leading to the tank line; means in the free flow line between the connections of said free flow line to the pressure source and tank line, and including a check-valved pilot branch leading to the discharge line in parallel with the second motor outlet, for splitting off a portion of the free flow line fluid as a pilot flow through the pilot branch to the discharge line when the first motor valve is in neutral; a steering valve operatively connected to the steering actuator and having an inlet passage and an exhaust passage connected respectively to the discharge and return lines and a pair of motor conduits connected to the second motor, said steering valve being neutrally positionable to carry the pilot flow therethrough from the discharge line to the return line to the exclusion of the second motor and being actively positionable by the steering actuator to connect the discharge and return lines respectively to the second motor conduits and thereby to effect a decrease in the pilot flow in the return line; hydraulically actuated valve means including a first element normally closing the second motor outlet and a second element normally leaving the free flow line open to the tank line and operative in response to active positioning of the steering valve, when the first motor valve is in neutral, to cause said first element to open the second motor outlet and said second element to cut off the free flow line from the tank line so that fluid flow builds up in the pressure line and supplies the requirements of said actively positioned steering valve via said open second motor outlet and discharge line; and a restricted by-pass line connecting the pressure line to the discharge line in by-passing relation to the second motor outlet for furnishing a substitute pilot flow from the pressure line when the first motor valve in its active position blocks the free flow line.

15. In a self-propelled combine having an adjustable header, variable-speed drive means and steerable wheel means, the improvement residing in a triple-valve hydraulic control system, comprising: a single pressure source; a dual valve mechanism having a tank line, a pressure line connected to the pressure source and including first, second and third motor outlets in parallel, a free flow line connected to the pressure source in parallel with the pressure line and leading to the tank line, and individual header and variable-speed valves respectively controlling said lines and motor outlets and arranged for individual active and neutral positioning such that both valves in neutral position leave the free flow line open to the tank line and only the first and second motor outlets are cut off from the pressure line and either valve in active position opens its motor outlet individually to the pressure line and simultaneously blocks the free flow line; a header-operating motor connected to the first motor outlet; a variable-speed motor connected to the second motor outlet; a steering motor; a steering valve hydraulically connected to the steering motor and having an inlet line connected to the return motor outlet and a return line connected to the tank line, said steering valve including a control element neutrally positionable to join the inlet and return lines exclusively of the steering motor and actively positionable to connect said inlet and return lines selectively to opposite sides of said steering motor; and a steering demand valve including means for splitting off a portion of the free flow line fluid to the steering valve inlet line when both the header and speed-change valves are in neutral, and valve means normally closing the third motor outlet to the steering valve inlet line and opening the free flow line to the tank line downstream of the splitting-off means and hydraulically operative in response to active positioning of the steering valve to cut off the free flow line from the tank line and to open the third motor outlet.

16. In a self-propelled combine having an adjustable part and steering mechanism including a steering actuator and steerable wheel means, the improvement residing in multi-valve hydraulic control means, comprising: a single fluid pressure source having a pressure line; first and second hydraulic motors connected respectively to the adjustable part and to the steerable wheel means; first and second fluid lines connected in parallel to the pressure line and leading respectively to the first and second motors; a first motor valve controlling the first fluid line and selectively neutrally and actively positionable to cut said first fluid line respectively out of and in to the pressure line and effective in either position to leave the pressure line open to the second fluid line; a fluid-flow-responsive valve normally closing the second fluid line; a steering valve in the second fluid line between the pressure-responsive valve and the second motor and connected to the actuator for selective neutral positioning to cut off the second motor from the second fluid line for active positioning to cut said second motor in to said second line; and demand valve means connected to and deriving fluid from the pressure source and communicating with the second fluid line downstream of the fluid-flow-responsive valve for normally maintaining a downstream fluid flow other than that necessary to incur opening of said fluid-flow-responsive valve while the steering valve is in neutral and operative in response to active positioning of said steering valve to incur the downstream fluid flow necessary to open said fluid-flow-responsive valve.

17. In an agricultural vehicle having a mobile frame, first and second adjustable parts, steerable wheel means and a control station, the improvement residing in multi-valve hydraulic control means operative from the control station, comprising: a single fluid pressure source including a pressure line and a tank line; first, second and third individual hydraulic motors arranged respectively at spaced apart locations on the mobile frame and mechanically connected respectively to the first and second adjustable parts and the wheel means; a unitary, multiple bank valve casing on the mobile frame and including a tank passage connected to the tank line and first, second and third motor passages connected in parallel to the pressure line and individually connected to the respective motors, said casing having movable therein first and second selectively individually and simultaneously operative control valves controlled from the control station and arranged for active and neutral positioning to regulate the first and second motor passages to the exclusion of the third motor passage, said casing further having a free flow line connected to the pressure line and open when both the first and second valves are neutrally positioned and closed when either of said valves is actively positioned; a steering valve remote from the casing and having inlet and exhaust lines and being fluid-connected to the third motor and selectively adjustable between a neutral position connecting said inlet and exhaust lines and an active position connecting the inlet and exhaust lines in circuit with the third motor; a steering demand unit mounted on the valve casing as an additional bank and including a discharge passage connecting the third motor outlet to the steering valve inlet and a return passage connecting the steering valve exhaust line to the casing tank passage and a free flow passage connecting the casing free flow line to the tank passage; and demand valve means in the demand unit hydraulically responsive to positioning of the steering valve for closing the free flow passage when the steering valve is in active position and for opening the free flow passage when the steering valve is in neutral position.

18. In an agricultural vehicle having a mobile frame, first and second adjustable parts, steerable wheel means and a control station, the improvement residing in multi-valve hydraulic control means operative from the control station, comprising: a single fluid pressure source including a pressure line and a tank line; first, second and third individual hydraulic motors arranged respectively at spaced apart locations on the mobile frame and mechanically connected respectively to the first and second adjustable parts and the wheel means; a unitary, multiple bank valve unit on the mobile frame and including a tank passage connected to the tank line and first, second and third motor passages connected in parallel to the pressure line and individually connected to the respective motors, said casing having movable therein first, second and third selectively individually and simultaneously operative control valves arranged for active and neutral positioning to regulate the first, second and third motor passages, said casing further having a free flow line connected to the pressure line and open when all of said valves are neutrally positioned and closed when any one of said valves is actively positioned; first and second separate means arranged at and controllable from the control station and operatively connected respectively to the first and second valves for positioning said first and second valves; a steering actuator remote from the multiple bank valve unit and actuated from the control station for selective neutral and active positioning; and remote control hydraulic means connected to the steering actuator and to the third valve and hydraulically operative in response to neutral and active positioning of the steering actuator and to move the third valve for respectively opening and closing the free flow passage.

References Cited in the file of this patent
UNITED STATES PATENTS

| | | |
|---|---|---|
| 1,991,227 | Procter et al. | Feb. 12, 1935 |
| 2,247,140 | Twyman | June 24, 1941 |
| 2,247,141 | Twyman | June 24, 1941 |
| 2,289,567 | Berglund | July 14, 1942 |
| 2,310,577 | Everett | Feb. 9, 1943 |
| 2,489,435 | Robinson | Nov. 29, 1949 |
| 2,510,325 | Anderson | June 6, 1950 |
| 2,577,999 | Christensen | Dec. 11, 1951 |